United States Patent [19]
Gill

[11] 3,940,674
[45] Feb. 24, 1976

[54] SUBMARINE OR VEHICLE STEERING SYSTEM

[75] Inventor: George H. Gill, China Lake, Calif.

[73] Assignee: The United States of America as represented by the Secretary of the Navy, Washington, D.C.

[22] Filed: Apr. 14, 1972

[21] Appl. No.: 244,084

[52] U.S. Cl.......... 318/589; 74/471 XY; 114/144 R
[51] Int. Cl.².................... G05D 1/02; B63H 25/02
[58] Field of Search.................... 318/588, 589, 590; 114/144 R; 74/471 XY, 471 R; 244/83 B

[56] References Cited
UNITED STATES PATENTS

| | | | |
|---|---|---|---|
| 3,306,125 | 2/1967 | Purcell | 74/471 XY |
| 3,662,243 | 5/1972 | Cavil et al. | 318/588 |
| 3,701,288 | 10/1972 | Jordan | 74/471 XY |

*Primary Examiner*—Richard A. Farley
*Attorney, Agent, or Firm*—Richard S. Sciascia; Ervin F. Johnston; William T. Skeer

[57] ABSTRACT

Four direct current motor systems are controlled by a single hand grip control device. Two of the motor systems have interacting control parameters while the remaining two are controlled independently of the other motor systems. The hand operated control mechanism is moved about three mutually perpendicular control axes to control three of the motor systems and carries thereon a fourth control which is positioned so as to be actuatable by the thumb of the operator using the control. The system of the invention has particular applicability in the control of submarine vehicles.

10 Claims, 6 Drawing Figures

3,940,674

SUBMARINE OR VEHICLE STEERING SYSTEM

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains to the control of a plurality of direct current electrical motors. More particularly, this invention pertains to the control of four direct current motor controls from a single operational control element. In greater particularity, the invention pertains to the control of four direct current electric motor systems, two of the systems having interrelated control functions and two of the systems being independent. In still greater particularity, but not by way of limitation thereto, the invention is directed to the control of a submersible vehicle from a single control handle.

DESCRIPTION OF THE PRIOR ART

Single handle type of controls for propulsive motor systems and steering systems are relatively well known in the prior art. However, such prior art control systems typically direct control surfaces which have a hydrodynamic interaction with the water so as to direct the movement of the underwater vehicle in response to a single thrust producing motor. For example, such a system is described in U.S. Pat. No. 2,918,889 to D. I. Rebikoff issued Dec. 29, 1959 for "Control Means for Underwater Vehicle." While such a system is suitable for its intended purpose as a vehicle control for a swimmer delivery vehicle, such systems are relatively inappropriate for deep sea research submersibles. This is because such vehicles are required to hover and remain at a constant depth and neutral buoyancy for long periods of time to permit the occupants to observe underwater phenomena. Such underwater vehicles use a plurality of motors to control the attitude and position of the vehicle as well as to control the speed and steering.

Of course, it is well known in the marine engineering art to provide steering and position controls by means of propulsion motors. However, such prior art steering systems utilize a plurality of controls one for each motor. In a small deep submergence vehicle where the operator and crew lie prone in a side by side position the space available and the permissible degree of freedom to manipulate a plurality of controls is at a minimum. Too, the available control space is frequently needed to control oceanographic scientific apparatus, illumination sources, life support systems, and other systems that must be carried by such vehicles. No known prior art control system has successively incorporated the control of all the functions of vehicle positioning in a satisfactorily small and easy to operate unit.

SUMMARY OF THE INVENTION

The system of the invention incorporates the speed and turning controls for the submarine vehicle together with the control of a lateral thruster and a vertical thruster so as to provide for all degrees of freedom of vehicle movement within a single control console. The control console comprises a box like support member and a single hand operated control handle. Provision is made to differentially control the side mounted propulsion units to permit steering as well as forward and aft propulsion power from these units. The control of these DC current motor systems is accomplished by sensing the position of a control handle by means of a plurality of electromechanical transducers and using the signals generated therefrom to control an analog computer to provide the necessary current control for the motor systems.

It should be obvious that a variety of motor control systems may utilize the device of the invention in substantially the same fashion as the described for the control of the submarine vehicle. However, for purposes of clearity and brevity, the system of the invention will be described as it pertains to such a submarine control system.

STATEMENT OF THE OBJECTS OF THE INVENTION

Accordingly, it is an object of the present invention to provide an improved motor control system.

A further object of the present invention is to provide a motor system's control operated from a single control lever.

Another object of the present invention is to provide a motor control system for direct current motors having four degrees of freedom of control.

Still another object of the present invention is to provide a control for a submarine vehicle which controls all movements of the submarine vehicle from a single handle.

These and other objects of the invention will become more readily apparent from the ensuing specification when taken with the drawings.

DESCRIPTION OF THE PREFERRED EMBODIMENT

Figure 1:
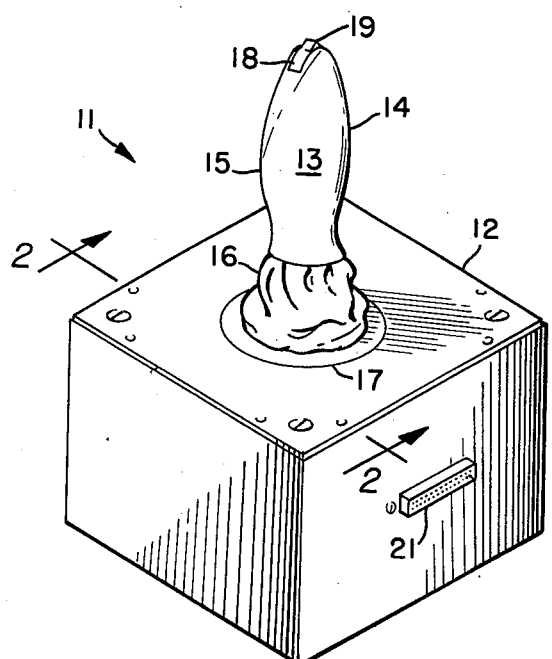
FIG. 1 is a perspective view of the control device according to the invention.

Referring to FIG. 1, it may be seen that the control assembly 11 according to the invention comprises a suitably shaped base enclosure 12 and a handle 13 extending thereabove. In the illustrated embodiment, base enclosure 12 is on a rectangular box shape, however, it should be understood that a variety of enclosure configurations may be utilized in order to get the equipment into a desired location. The only requirement as to the configuration of base enclosure 12 is that there be sufficient room in the interior thereof to permit movement of the control parts therein, as will be presently described. Likewise, base enclosure 12 may be made of any suitable material. However, for purpose of completeness, it should be noted that the enclosure used in the prototype model of the invention was a cast aluminum enclosure commonly employed in electronic arts as a foundation for circuit assembly. However, as will be readily understood, a molded plastic base enclosure would serve as well in most applications. In the submersible vehicle arts, lightweight and corrosion resistance are primary considerations in the selection of any material and this reason as well as the standardization of circuit components govern the choice of the selection of the particular units used.

Handle 13 is made of a suitable plastic, glass fiber, or other easily worked material. It will be observed that handle 13 is asymmetrically shaped when viewed from above. That is, one edge is rounded as shown at 14 while the opposite edge is flatened as indicated at 15. The reason for this asymmetry of configuration is to provide a comfortable grip for an operator of the control assembly. As may be readily appreciated, the configuration shown permits the device to be used by either a left handed or a right handed person for relatively long periods of time without experiencing undue fatigue. Such an anatomical design is of great importance in maintaining the precision of control for oceanographic submersibles for the long periods that they are often deployed.

To prevent entry into base enclosure 12 of undesired particulate matter and moisture that may be present in the interior of the submersible vehicle, a suitably shaped boot 16 surrounds handle 13 and is attached to the upper surface of base enclosure 12 by means of a retaining ring 17. Boot 16 may be constructed of a suitable flexible material such as polyvinyl or other synthetics.

At the upper end of handle 13, a thumb wheel 18 is mounted. Handle 13 is rounded at its upper end to expose thumb wheel 18 along an extent of its circumference exceeding 180°. As will be more fully explained herein, thumb wheel 18 is the operating member of a resistive potentiometer. A variety of such potentiometers are available in the electronic arts and any example meeting the size and electrical requirements dictated by the circuit and mechanical configuration of the invention may be used. As shown, a suitably shaped index 19 is mounted on thumb wheel 18 to permit the operator to determine the relative rotational position of thumb wheel 18 without visual reference to gear thumb wheel 18 or any other instrumentation. Index 19 may be cemented to thumb wheel 18 or, in some instances, simply be comprised of a small mass of cementitious material.

An electrical connector 21 extends through the side of base enclosure 12 so as to permit electric connection to be made between external portions of the circuit and those portions contained within base 12. The connector shown is of a general oblong shape and has mounted therein a plurality of rows of discrete connector pins. However, the particular configuration of the electrical connector is of no critical importance to either the understanding or successful operation of the device of the invention and, accordingly, other suitable connectors may be substituted for the illustrated connector 21, if desired.

Figure 2:
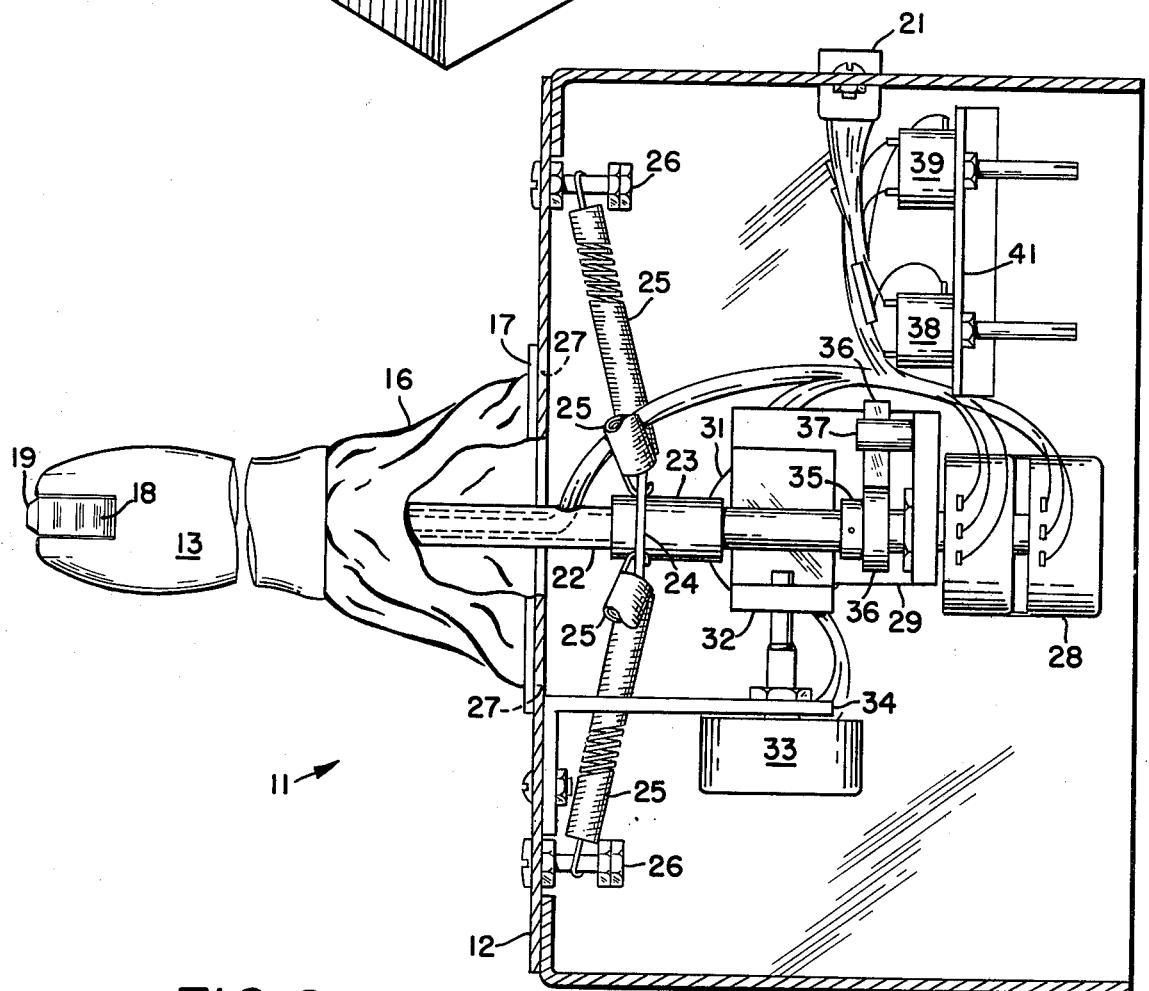
FIG. 2 is a sectional view taken along lines 2—2 of FIG. 1.
Figure 3:
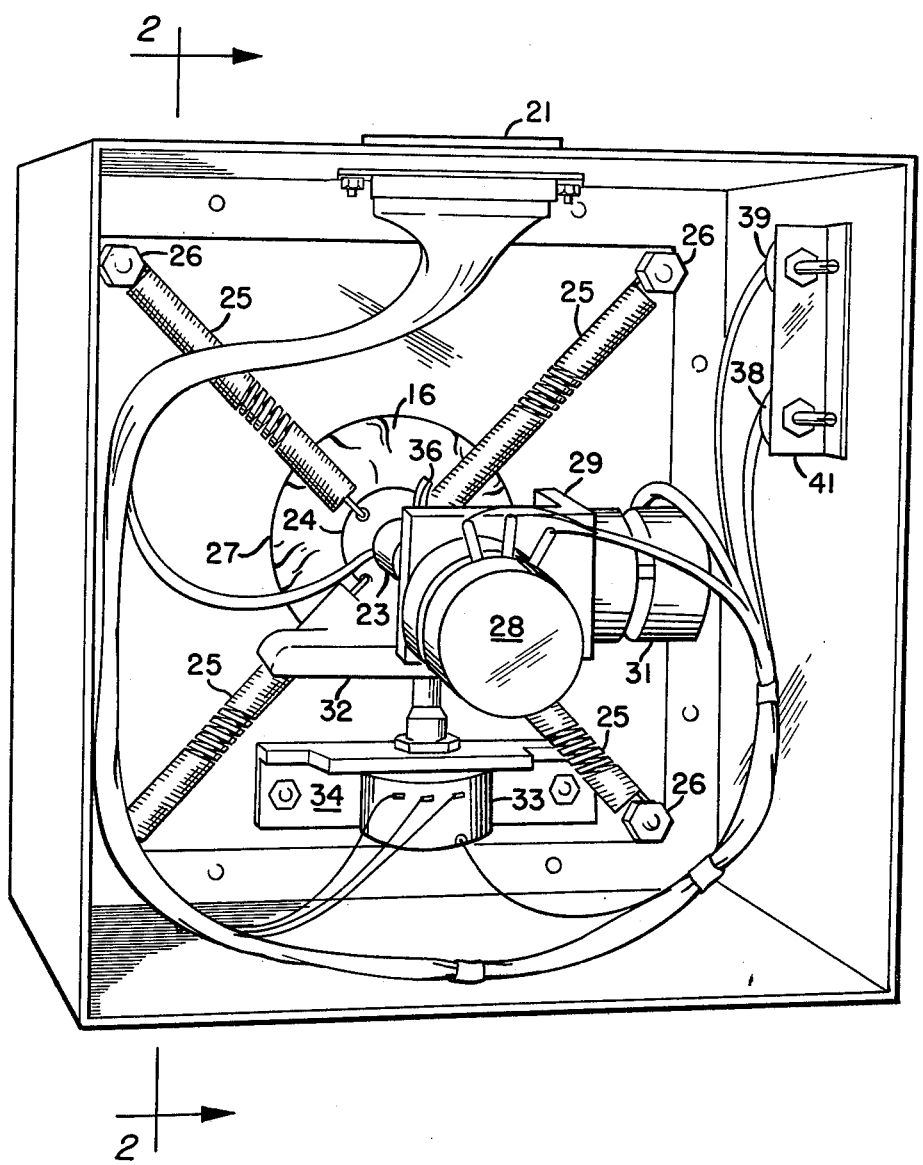
FIG. 3 is a bottom view of a control box of the device according to FIG. 1 with a lower cover removed.

Referring now to FIGS. 2 and 3, the arrangement of electromechanical transducers and mounting hardware comprising a control assembly 11 will now be described. As may be seen, a shaft 22 extends downwardly from handle 13 and is turned and moved thereby in response to manual manipulation by the operator. Shaft 22 is hollow to permit wires to pass therethrough to the potentiometer mounted in handle 13 and is secured into one end of a suitable bushing 23 so as to transmit motion thereto. Bushing 23 is rotatably mounted in a collar 24. Collar 24 is made of a thin piece of sheet stock metal and, for purposes of illustration, may be considered to be fabricated from sheet steel and, in developmental models, a washer made of this material was used. Of course, other materials may be used in the fabrication of collar 24 if desired.

Four equal-strength springs 25 are attached to collar 24 and arrayed outwardly therefrom in a cruciform pattern. Springs 25 are secured to suitable spring mounts 26 which are positioned on the cover of base enclosure 12 so as to extend downwardly on the underside thereof. Springs 25 provide a resilient positioning means to center collar 24 under a suitably oversized aperture 27 through which shaft 22 extends. It may be seen therefore that springs 25 and collar 24 together with bushing 23 provide a resilient centering means to hold handle 13 in a reference or neutral position.

A dual potentiometer 28 has its shaft connected to the other side of bushing 23 from which shaft 22 is fastened. The dual body portion of dual potentiometer 28 is connected to a suitable coupling means which, for purposes of explanatory clearity, will be termed body bracket 29. In the illustrated embodiment, body bracket 29 is simply a section of right angle metal stock, however, other configurations may be used if desired. A second dual potentiometer 31 is attached to body bracket 29 in such a fashion that the control shaft thereof is held at right angles to the control shaft of dual potentiometer 28.

The control shaft of dual potentiometer 31 is connected to a suitable coupling means which for purposes of illustration and clarity of explanation will be termed shaft bracket 32. In the developmental embodiment of the invention, shaft bracket 32, like body bracket 29, is made of a short section of metallic angle stock. In the invention both body bracket 29 and shaft bracket 32 are made of aluminum stock, however, other material may be used if deemed desirable without departing from the spirit or scope of the invention.

The control shaft of a single-section potentiometer 33 is also connected to shaft bracket 32 in such a fashion that it is positioned at right angles to the control shaft of dual potentiometer 31. Further, it should be noted, that the control shaft of dual potentiometers 28 and 31 and the control shaft of potentiometer 33 are positioned such that if the shafts of potentiometers 28 and 33 were extended they would intersect at a common point within the control shaft of dual potentiometer 28. The body of potentiometer 33 is supported by a suitable mounting plate 34 which is attached to the cover of base enclosure 12 to, thereby, provide mounting support for the entire potentiometer system. As will be readily understood, the mounting plate 34 and shaft bracket 32 and body bracket 29 cooperate with the aforementioned potentiometers to constitute a mechanical mounting system such as to spacially fix the point of intersection of the control shafts of the respective potentiometers with respect to the cover plate of base enclosure 12 while the remainder of the control shaft is moved as handle 13 is moved about. In summary, potentiometer 33 is connected to mounting plate 34 and potentiometers 28 and 31 are connected to body bracket 29 by conventional potentiometer hardware. In the potentiometers used in the developmental model of the invention, the connecting hardward is a concentric threaded nut placed to engage a threaded boss extending outwardly from the bodies of the potentiometers. This conventional arrangement is illustrated in FIGS. 2 and 3 in connecting potentiometers 28 and 33.

The shafts of potentiometers 31 and 33 are attached to shaft bracket 32 and the shaft of potentiometer 28 is attached to bushing 23 by any suitable mechanical means used to fixedly secure a shaft to another structure. Reference to such standard works as *Handbook of Fastening and Joining of Metal Parts* by Laughner and Hargan, McGraw-Hill, 1956, Library of Congress, Catalog Card Number 54-8801 will indicate that a variety of conventional mechanisms for accomplishing this connection are known in the prior art. Selection of one of these standard arrangements is a matter of design choice. For example, those connections shown on pages 528 and 529 of the above cited reference work may be used for the shaft of potentiometer 28. Likewise, those shown on pages 522 and 523 of the above cited work, may be used for the shafts of potentiometers 31 and 33 to bracket 32.

The word "connected" as used in the foregoing discussion means joined or united into a unitary assembly as defined in Webster's *New International Dictionary*, second edition, copyright 1934 by G & C Merriam Co.

Thus, the structure recited provides for a coupling of each of the various potentiometers 28, 31, and 33 to a movement of handle 13 by use of brackets 29 and 32 and the potentiometers themselves as coupling means.

Although the aforedescribed linkages are sufficient from a theoretical standpoint, it has been found that an improvement in the action thereof results by providing an additional centering action for the control shaft for dual potentiometer 28. This action is provided by a suitable bushing 35 which is resiliently held by a spring 36 attached to a post 37 supported by body bracket 29. Because the shafts of potentiometers 31 and 33 are controlled by the handle position, no similar additional mechanism is required in the illustrated configuration. However, should a configuration be adopted in which the illustrated centering springs 25 are eliminated, such a centering means may be provided without departing from teachings or spirit of the invention.

Because the two dual potentiometers 28 and 31 are not exactly balanced, that is, the manufacturing tolerances do not permit the manufacture of the units such that the two potentiometer sections operate exactly synchronously, additional balance potentiometers 38 and 39 are provided. Balancing potentiometers 38 and 39 are, themselves, dual section potentiometers. However, because they are subject to little or no mechanical strain, they may be of the miniature type. As shown, balancing potentiometers 38 and 39 are mounted on a suitable small mounting panel with their shafts extending downwardly. As in convention in the electronics art, the shafts of balancing potentiometers 38 and 39 are provided with screwdriver engaging slots such that they may be adjusted by use of a screwdriver extending through holes provided in the bottom plate, not shown, of base enclosure 12.

Figure 4:
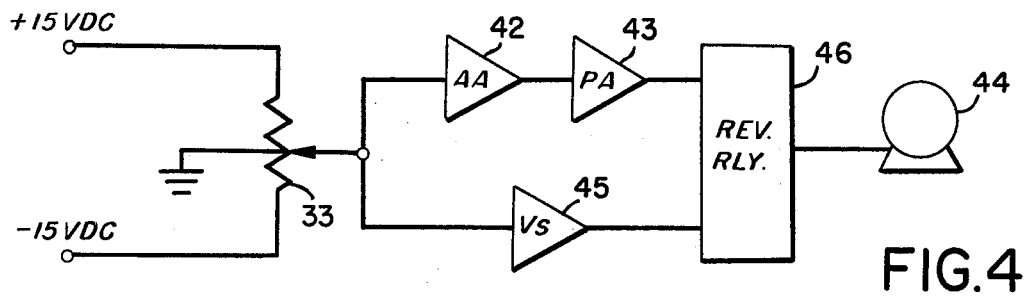
FIG. 4 is a circuit diagram of one of the control amplifiers according to the invention.

Referring now to FIG. 4, a circuit suitable for control of one of the motors in accordance with the invention will be described. As may be seen, the output of a symmetrical power supply applies a DC voltage to either end of potentiometer 33. The symmetrical power supply is a conventional circuit and as such need not be described in further detail. However, for purposes of completeness, it should be noted that the power supply marketed under the name Mill Associates, PD212, has proven satisfactory in actual service. Likewise, for purposes of clarity, potentiometer 33 is shown as having a center tap which is grounded, however, satisfactory results have been obtained with potentiometers having no center tap. The wiper of potentiometer 33 is connected to an absolute value amplifier 42 which in turn is connected to drive power amplifier 43.

It will be observed that the output from potentiometer 33 is fed to a voltage sensing amplifier 45. Voltage sensing amplifier 45 is sensitive to the polarity of the voltage tapped from potentiometer 33 by the wiper thereof. The output of voltage sensing amplifier 45 is connected to a reversing relay 46. It will also be observed that the output of power amplifier 43 is connected to reversing relay 46 which, in turn, is connected to a direct current motor 44. The operational connections are made such that the reversing relay 46 reverses the power connections to motor 44.

Direct current motor 44 may be considered the motor which controls the lateral thruster which positions the submarine vehicle from side to side in response to lateral movement of handle 13. However, it should be noted that the circuit arrangement is the same in the instance where the vertical thruster is controlled by potentiometer mounted within handle 13 and controlled by thumb wheel 18.

Figure 5:
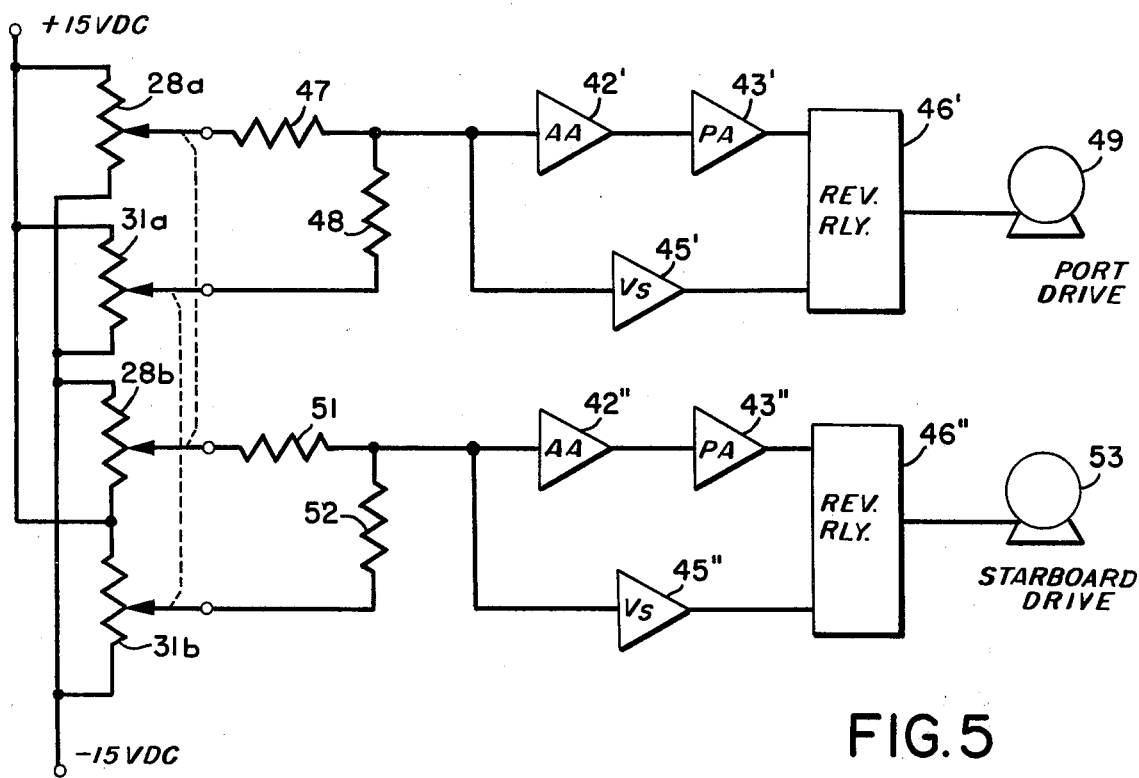
FIG. 5 is a circuit diagram of another control system according to the invention.

Referring now to FIG. 5 the circuit arrangement to control port and starboard drive motors will be described. As may be readily seen, the circuit of FIG. 5 comprises two motor drive systems similar to that shown in FIG. 4. However, it will be noted that, rather than have a single input, each of the motor drive systems receives an input control voltage from two sources. Potentiometer 31 which is a dual section potentiometer having sections 31a and 31b is used to control the the speed of the two motors and the direction of rotation and is, therefore, connected such that the voltage changes effected by movement of handle 13 are in phase, that is, both are either positive or negative. Potentiometer 28 is likewise a dual potentiometer having sections 28a and 28b and is used to provide a signal to vary the speed of the thrusters so as to turn the submersible vehicle either right or left. Accordingly, the potentiometer sections 28a and 28b are connected such that the potentiometer outputs are opposite of phase, that is one is positive and the other is negative.

The need for a duality of control becomes apparent in considering the method of steering and control of a sumbersible vehicle. That is, submersibles are steered by two motors mounted on either side of the vehicle which also provide the thrust for forward movement. Since these thrusters have dual functions, their control must be carefully interphased for the desired purpose. For example, if directional control is desired without forward speed, that is, in a hovering type operation where it is desired to turn the vehicle to a different heading, power must be applied by the two thrusters proportionately on the axes about which the turn is desired. This requires that one thruster be driven in a forward mode and the other in a reverse mode applying equal but oppositely directed torques. Similarly, if a change in heading is desired while the vehicle is experiencing forward motion one of the thrusters must have its rotational velocity reduced while at the same time the opposite thruster has its rotational velocity increased. For those familiar with small boat navigation, this steering technique is readily understandable, however, small boats generally have separate throttle controls for each of the two motors and to develop the coordination required for maneuvering in close quarters requires considerable experience and training. In a scientific submersible vehicle the crew is generally limited to the scientists who are gathering scientific data and to train such personnel in accurate small boat handling is undesirable and has been made unnecessary by the device of the invention.

Referring again to FIG. 5, it may be seen that the control signals from the *a* section of potentiometers 28 and 31 are combined by means of two resistors 47 and 48 which are joined together at a summing point which is the input to the absolute value amplifier 42'. The individual amplifiers, as indicated by their numbers, perform in precisely the same fashion as the circuit illustrated and described in FIG. 4. The output of the circuit of reversing relay 46' is used to drive a port drive motor 49.

Similarly, the *b* sections of potentiometers 28 and 31 are combined to a summing point input by means of resistors 31 and 52 which are connected between the wipers thereof and the input of absolute value amplifier 42''. Absolute value amplifier 42'' and power amplifier 42'' together with voltage sensing amplifier 45'' and reversing relay 46'' drive a starboard drive motor 53. As above, the method of operation is the same as that previously described in connection with FIG. 4.

Figure 6:
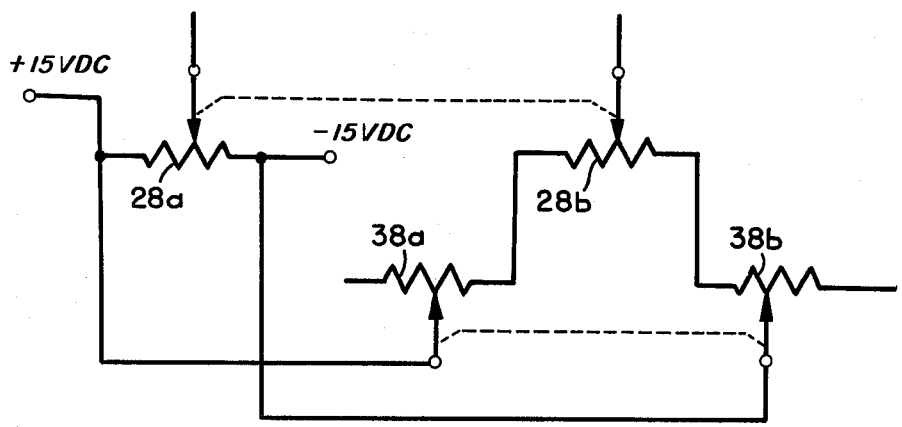
FIG. 6 is a schematic diagram of a balance circuit used in the invention.

As previously noted, the manufacturing tolerances for dual potentiometers having a high enough wattage and a sufficiently rugged physical construction to perform satisfactorily in the control circuit of the invention are seldom close enough to cause the two sections identified as *a* and *b* in FIG. 5, to be in exact electrical synchronism. The two sections of the dual potentiometers 28 and 31, previously described in connection with FIGS. 2 and 3, are brought into electrical balance by means of padding one of the potentiometers by a small dual section potentiometer which electrically shifts the center point thereof. The circuit which makes this possible is illustrated in FIG. 6. It may be seen that rather than connect the *b* section of potentiometer 28 in parallel with the *a* section as shown in FIG. 5, the *b* section has a stationary portion of each section of potentiometer 38 on either side thereof so as to provide a series resistance comprising section 38*a*, section 28*b* and section 38*b* of the respective potentiometers. The wipers of potentiometers 38 are then connected to the positive and negative supply potential, or in parallel with the *a* section of potentiometer 28. It may be seen that rotation of potentiometer 38 has the effect of shifting the center point of potentiometer 28*b* so that it coincides with potential obtained in the wiper of potentiometer 28*a*. This may be easily obtained by placing a voltmeter across the wipers of potentiometer 28 and adjusting potentiometer 38 until there is zero potential difference between the two wipers. Of course, potentiometer 39 shown in FIGS. 2 and 3, is connected in a similar fashion with potentiometer 31 to provide a balance control therefor. If desired, the balance potentiometers 38 and 39 may be connected with the *a* section of the respective potentiometer to balance it with the *b* section rather than being connected with the *b* section as shown.

The foregoing description taken together with the appended claims constitute a disclosure such as to enable a person skilled in the electronic and marine engineering arts and having the benefit of the teachings contained therein to make and use the invention. Further, the structure herein described meets the objects of invention, and generally constitutes a meritorous advance in the arts unobvious to such skilled workers not having the benefit of the teachings contained herein.

Obviously, many modifications and variations of the present invention are possible in the light of the above teachings, and, it is therefore understood that within the scope of the disclosed inventive concept, the invention may be practiced otherwise than specifically described.

What is claimed is:

1. A control system for selective actuation of four reversible DC motor systems comprising:
   a control handle movably mounted for rotation about three mutually perpendicular axes;
   first electromechanical transducer means mechanically coupled to said control handle for generating an electrical analog signal in response to movement of said control handle about each of said three axes;
   hand grip means mounted on said control handle and shaped to be gripped by a closed human hand for providing a handle engaging surface for said control handle which may be operated for extended periods without fatigue;
   second electromechanical transducer means carried by said hand grip means and positioned thereon so as to be engagable by the thumb of an operator using the handle for providing an additional parameter of control than that provided by the handle coupled transducer means; and
   circuit means connected to each of said electromechanical transducer means in such a fashion as to generate control signals for two of the four reversible DC motors which are dependent on movement of said control handle about two of said three axes and to generate control signals for each of the two remaining reversible DC motors each being independent of the other and dependent on movement of said handle about the remaining axis of movement of said control handle and the operation of the thumb engaged electromechanical transducer.

2. A control system according to claim 1 further including:
   base means for providing an enclosure for said first electromechanical transducer means and a support for said control handle;
   journal means extending around and rotatably supporting said control handle for centering said handle with respect to said base means;
   resilient means connected between said journal means and said base means for biasing said journal means and control handle carried therein to a reference position with respect to said base means.

3. A control system according to claim 2 wherein the aforesaid first electromechanical transducer means includes:
   a first potentiometer having its body secured to said base means and its shaft free to rotate with respect to said base;
   shaft coupling means attached to the shaft of said first potentiometer for providing an operating connection therefor;
   a second potentiometer having its shaft connected to said shaft coupling means at right angles to the shaft of said first potentiometer;
   a third potentiometer having its shaft connected to and held in line with the aforesaid control handle;

and potentiometer body coupling means connected to the body portion of said second and third potentiometer means to effectively mount said second and third potentiometers at right angles to each other, whereby movement of said control handle about any of its three axes of movement causes a corresponding movement of one of the first, second, or third potentiometers.

4. A control system according to claim 3 wherein said second and third potentiometers are dual section potentiometers.

5. A control system according to claim 1 in which said second electromechanical transducer comprises a fourth potentiometer having a wheel operator mounted at the top of said handle means exposed to permit engagement by the thumb of a person gripping the handle and having an index means protruding therefrom for indicating the position of the wheel operator relative to the handle means.

6. A control system according to claim 5 in which said circuit means includes:
  absolute value amplifier means connected to the adjustable wiper of said fourth potentiometer to receive an input signal therefrom in response to movement of said wheel for producing a signal corresponding to amount of movement of said wheel;
  voltage sensing amplifier means connected to the adjustable wiper of said fourth potentiometer to receive an input signal therefrom in response to the movement of said wheel for producing an output signal related to the direction of movement of said wheel with respect to a central datum position;
  reversing switch means connected to said voltage sensing amplifier means for reversing its operational position in response to the output of said voltage sensing amplifier means; and
  power amplifier means connected to said absolute value amplifier means to receive signals therefrom and connected to one of said reversible DC motors via said reversing relay means for driving said motor at a speed determined by the signals from said absolute value amplifier means and in a direction determined by the signals from said voltage sensing amplifier means.

7. A control system according to claim 3 in which said circuit means includes:
  absolute value amplifier means connected to the adjustable wiper of said first potentiometer to receive an input signal therefrom in response to movement of said handle for producing a signal corresponding to amount of movement of said handle;
  voltage sensing amplifier means connected to the adjustable wiper of said first potentiometer to receive an input signal therefrom in response to the movement of said handle for producing an output signal related to the direction of movement of said handle with respect to a central datum position;
  reversing switch means connected to said voltage sensing amplifier means for reversing its operational position in response to the output of said voltage sensing amplifier means; and
  power amplifier means connected to said absolute value amplifier means to receive signals therefrom and connected to one of said reversible DC motors via said reversing relay means for driving said motor at a speed determined by the signals from said absolute value amplifier means and in a direction determined by the signals from said voltage sensing amplifier means.

8. A control system according to claim 4 in which said circuit means includes:
  a first absolute value amplifier means effectively connected to the wipers of one section of said second and third potentiometers through a summing network for generating an output signal which is the sum of the two signals generated thereby in response to movement of said control handle about the two axes of movement of the potentiometers;
  a first voltage sensing amplifier means connected in electrical parallel with said absolute value amplifier means so as to receive the signal from the summing network for producing an output signal related to the polarity of the signal from the summing network;
  a first reversing switch means connected to said voltage sensing amplifier means so as to be operated thereby for reversing switching circuitry in response to the polarity of the output signal from the summing circuit; and
  a first power amplifier means connected to said absolute value amplifier to be driven thereby and connected via said reversing switch means to one of the aforesaid reversing DC motors for generating driving potentials therefor,
  whereby said motor is controlled by a composite motion of the aforesaid handle along two axes of movement thereof.

9. A control system according to claim 8 further including a second absolute value amplifier means, a second voltage sensing means, a second reversing switch means and a second power amplifier means connected to the other sections of the aforesaid second and third potentiometer and connected together in the same manner as the first ones thereof to form a parallel second channel for driving a different one of the aforesaid reversible DC motors in response to movement of the aforesaid handle along the two axes of movement thereof.

10. A control system according to claim 9 wherein the second sections of the aforesaid second and third potentiometers are connected to a voltage source in an inverse fashion with respect to the first sections thereof.

* * * * *